United States Patent
Gandolph et al.

(10) Patent No.: US 10,127,671 B2
(45) Date of Patent: Nov. 13, 2018

(54) METHOD AND APPARATUS FOR GENERATING SUPERPIXEL CLUSTERS

(71) Applicant: THOMSON LICENSING, Issy de Moulineaux (FR)

(72) Inventors: Dirk Gandolph, Ronnenberg (DE); Wolfram Putzke-Roeming, Hildesheim (DE)

(73) Assignee: THOMSON LICENSING, Issy-les-Moulineaux ( * ) Notice: Subject to any disclaimer, the term of this patent is extended or adjusted under 35 U.S.C. 154(b) by 0 days.

(21) Appl. No.: 14/877,791

(22) Filed: Oct. 7, 2015

(65) Prior Publication Data
US 2016/0104294 A1 Apr. 14, 2016

(30) Foreign Application Priority Data
Oct. 8, 2014 (EP) .................................... 14306577

(51) Int. Cl.
*G06T 7/00* (2017.01)
*G06T 1/00* (2006.01)
*G06T 7/11* (2017.01)
*G06T 7/187* (2017.01)

(52) U.S. Cl.
CPC .............. *G06T 7/0081* (2013.01); *G06T 7/11* (2017.01); *G06T 7/187* (2017.01); *G06T 2207/10024* (2013.01); *G06T 2207/10028* (2013.01); *G06T 2207/20101* (2013.01)

(58) Field of Classification Search
CPC ............................ G06T 7/0081; G06T 7/0065
USPC .......................................................... 345/591
See application file for complete search history.

(56) References Cited

U.S. PATENT DOCUMENTS

| 6,538,660 B1* | 3/2003 | Celi, Jr. ................... G09G 5/14 345/592 |
| 8,432,434 B2 | 4/2013 | Veeraraghavan et al. |
| 2012/0327172 A1* | 12/2012 | El-Saban ........... G06K 9/00228 348/14.02 |
| 2015/0003725 A1* | 1/2015 | Wan ....................... G06T 7/0081 382/154 |

FOREIGN PATENT DOCUMENTS

| CN | 103002309 | 3/2013 |
| CN | 103177450 | 6/2013 |

OTHER PUBLICATIONS

Achanta etal: "SLIC superpixels compared to state-of-the-art superpixel methods"; IEEE Transactions on Pattern Analysis and Machine Intelligence, vol. 43 No. 11; Nov. 2012; pp. 2274-2281.*
(Continued)

*Primary Examiner* — Hai Tao Sun
(74) *Attorney, Agent, or Firm* — Meagher Emanuel Laks Goldberg & Liao, LLP

(57) ABSTRACT

A method and an apparatus for generating a superpixel cluster for an image or a sequence of images. A primary clustering unit generates a primary superpixel cluster using a fixed reference superpixel, whereas a secondary clustering unit generates two or more secondary superpixel clusters using a propagating reference superpixel. A combining unit then combines intersections between the primary superpixel cluster and the two or more secondary superpixel clusters to generate a final superpixel cluster.

21 Claims, 6 Drawing Sheets

(56) References Cited

OTHER PUBLICATIONS

Maceira et al.: "Fusion of colour and depth partitions for depth map coding"; 2013 18th International Conference on Digital Signal Processing (DSP); Jul. 2013; pp. 1-7.*
Anonymous: "Novel scene representations for richer networked media"; Research project SCENE—Novel representations for digital media beyond sample based (video) or model-based (graphics) http://3d-scene.eu/index.htm; Apr. 9, 2014; pp. 1.
Cigla et al.: "Object segmentation in multi-view video via color, depth and motion cues"; 2009 IEEE 17th Signal Processing and Communications Applications Conference (SIU); Published Oct. 12, 2008; pp. 2724-2727
Furch et al.: "D4.3.2 Hybrid Scene Analysis Algorithms", Oct. 30, 2013 (Oct. 30, 2013), pp. 1-60.
Kumar et al.: "Efficiently selecting regions for scene understanding"; 2010 IEEE Conference on Computer Vision and Pattern Recognition (CVPR), Jun. 13-18, 2010, Jun. 13, 2010 (Jun. 13, 2010), pp. 3217-3224.
Pantofaru et al.: "Object Recognition by Integrating Multiple Image Segmentations"; Oct. 12, 2008 (Oct. 12, 2008) pp. 481-494.
Ren et al.: "gSLIC: a real-time implementation of SLIC superpixel"; Technical Report University of Oxford, Department of Engineering Science; Jun. 28, 2011; pp. 1-6.
Reso et al.: "Temporally Consistant Superpixels"; Technical Report XT60-2012-001, Technicolor R&I, Nov. 2012; 2013 IEEE, pp. 385-392.
Um et al.: "Improvement of segment-based depth estimation using a novel segment extraction"; 3DTV-Conference: The True Vision—Capture, Transmission and Display of 3D Video (3DTV-CON 2010); Jun. 7, 2010; pp. 1-4.
Search Report dated Mar. 13, 2015.

* cited by examiner

METHOD AND APPARATUS FOR GENERATING SUPERPIXEL CLUSTERS This application claims the benefit, under 35 U.S.C. § 119 of European Patent Application No. 14306577.9, filed Oct. 8, 2014.

FIELD OF THE INVENTION

The invention relates to a method and an apparatus for generating superpixel clusters for an image, and more specifically to a method and an apparatus for generating superpixel clusters using an improved and more significant color base and creating more consistent cluster shapes.

BACKGROUND OF THE INVENTION

Today there is a trend to create and deliver richer media experiences to consumers. In order to go beyond the ability of either sample based (video) or model-based (CGI) methods novel representations for digital media are required. One such media representation is SCENE media representation (http://3d-scene.eu). Therefore, tools need to be developed for the generation of such media representations, which provide the capturing of 3D video being seamlessly combined with CGI.

The SCENE media representation will allow the manipulation and delivery of SCENE media to either 2D or 3D platforms, in either linear or interactive form, by enhancing the whole chain of multidimensional media production. Special focus is on spatio-temporal consistent scene representations. The project also evaluates the possibilities for standardizing a SCENE Representation Architecture (SRA).

A fundamental tool used for establishing the SCENE media representation is the deployment of over-segmentation on video. See, for example, R. Achanta et al.: "*SLIC Superpixels Compared to State-of-the-Art Superpixel Methods*", IEEE Transactions on Pattern Analysis and Machine Intelligence, Vol. 43 (2012), pp. 2274-2282. The generated segments, also known as superpixels or patches, help to generate metadata representing a higher abstraction layer, which is beyond pure object detection. Subsequent processing steps applied to the generated superpixels allow the description of objects in the video scene and are thus closely linked to the model-based CGI representation.

An application evolving from the availability of superpixels is the generation of superpixel clusters by creating a higher abstraction layer representing a patch-based object description in a scene. The process for the superpixel cluster generation requires an analysis of different superpixel connectivity attributes. These attributes can be, for example, color similarity, depth/disparity similarity, and the temporal consistency of superpixels. The cluster generation usually is done semi-automatically, meaning that an operator selects a single initial superpixel in the scene to start with, while the cluster is generated automatically.

A well-known clustering method for image segmentation is based on color analysis. The color similarity of different picture areas is qualified with a color distance and is used to decide for a cluster inclusion or exclusion of a candidate area. The final cluster forms the connected superpixel. However, this method does not work reliable in cases where scene objects are indistinguishable by means of their colors. In such cases the clustering based on color information will combine superpixels belonging to different objects, e.g. a person and the background, into the same cluster of connected superpixels and thus violating the object association.

This weakness can be handled by additionally analyzing depth information available in the image. By incorporating the depth distance measures between superpixels for a cluster forming the results of connected superpixels are improved. Incorporating color and depth allows detecting the object borders and helps avoiding the presence of foreground and background elements within a connected superpixel.

A further difficulty arises from the different properties given for features like color and depth when generating the connected superpixels. While the color clustering evaluates the color distance between one primary selected superpixel and any candidate superpixels for the cluster affiliation, the depth evaluation has to consider pairs of superpixels which are directly neighboring only. This is necessary as the depth information represents a three dimensional surface in the scene and a superpixel depth distance measured between the first initial superpixel and the second far away candidate superpixel potentially generates very large depth distances and thus undermines any threshold criteria. Therefore, the cluster forming based on depth requires a propagating cluster reference, where the reference is moving to the border of the growing cluster of superpixels. This is different from the cluster forming based on color, which requires a fixed cluster reference.

The deviating properties manifested by the fixed cluster reference needed for color information and the propagating cluster reference needed for depth information impede a homogeneous cluster forming. Thus the cluster forming for color and depth is typically separated. In a first step the individual clusters for depth and color are generated, which are determined independently from each other by ignoring any cross information. In a second step the two cluster results are combined by intersecting the sets. A disadvantage of this solution is that disrupted shapes of the superpixel clusters may appear, which consist of isolated areas. Such a result infringes the connectivity objective.

SUMMARY OF THE INVENTION

It is thus an object of the present invention to propose an improved solution for generating superpixel clusters.

According to the invention, a method for generating a superpixel cluster for an image or a sequence of images comprises:
   generating a primary superpixel cluster using a fixed reference superpixel;
   generating two or more secondary superpixel clusters using a propagating reference superpixel; and
   combining intersections between the primary superpixel cluster and the two or more secondary superpixel clusters to generate a final superpixel cluster.

Accordingly, an apparatus configured to generate a superpixel cluster for an image or a sequence of images comprises:
   a primary clustering unit configured to generate a primary superpixel cluster using a fixed reference superpixel;
   a secondary clustering unit configured to generate two or more secondary superpixel clusters using a propagating reference superpixel; and
   a combining unit configured to combine intersections between the primary superpixel cluster and the two or more secondary superpixel clusters to generate a final superpixel cluster.

Similarly, a computer readable storage medium has stored therein instructions enabling generating a superpixel cluster for an image or a sequence of images, which when executed by a computer, cause the computer to:

generate a primary superpixel cluster using a fixed reference superpixel;

generate two or more secondary superpixel clusters using a propagating reference superpixel; and combine intersections between the primary superpixel cluster and the two or more secondary superpixel clusters to generate a final superpixel cluster.

In one embodiment, the primary superpixel cluster and the two or more secondary superpixel clusters are generated by analyzing distances between properties of a superpixel and the respective reference superpixel. Advantageously, the primary superpixel cluster is generated based on a first property of the superpixels, e.g. color information, and the two or more secondary superpixel clusters are generated based on a second property of the superpixels, e.g. depth information.

The above described present principles recognize and improve upon the disadvantages of the existing known solutions as already noted previously in BACKGROUND OF THE INVENTION. That is, the known solutions analyze color and depth information independently by forming separate clusters. This is done because of the heterogeneous properties of color and depth. The superpixel similarity evaluation based on color distances requires a fixed reference superpixel, against which all candidate superpixels are tested. The superpixel similarity evaluation based on depth distances needs a propagating reference superpixel, where the reference always is a superpixel directly neighboring the candidate superpixel. The difference in the two kinds of reference superpixels suggests to treat color and depth features separately and to merge the independently generated cluster result. This may result in the creation of disrupted shapes for the final superpixel cluster. However, superpixel clusters consisting of isolated parts infringe the underlying connectivity objective.

The proposed solution provides an improved clustering method combining cluster forming using a fixed reference superpixel and cluster forming using a propagating reference superpixel. The new cluster forming process is a heterogeneous clustering algorithm, which simultaneously analyzes two features, e.g. color and depth information. The resulting superpixel clusters are reliable and always connected. The proposed solution is applicable to single images as well as to sequences of images, e.g. successive images of a video sequence or multi-view images of a scene.

In one embodiment, a superpixel is marked as tentatively accepted if a distance between a selected property of the superpixel relative to the respective reference superpixel does not exceed a respective threshold. A superpixel marked as tentatively accepted is only affiliated to the final superpixel cluster if the superpixel is marked as tentatively accepted both in the primary superpixel cluster and in at least one of the two or more secondary superpixel clusters. Marking superpixels as tentatively accepted allows easily determining which superpixels should be affiliated to the final superpixel cluster once all primary and secondary superpixel clusters have been generated.

In one embodiment, the primary superpixel cluster and the two or more secondary superpixel clusters are generated from superpixels associated to the same image. While this is necessarily the case when single images are processed, also for image sequences each image may be processed individually. In this case information from other images of the image sequence is not taken into account for superpixel clustering.

In another embodiment, the primary superpixel cluster and the two or more secondary superpixel clusters are generated from superpixels associated to the same image and superpixels associated to different images of the sequence of images. As the superpixel clusters are reliable and always connected, they can be used to create superpixel volumes. Here the cluster forming is extended to previous and following images in a sequence. A shape disruption would create disruptive formation of particles not feasible for object modifications in a scene, which is no longer the case when the heterogeneous clustering approach is used.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

The superpixel clusters are generated by evaluating feature distances existing between pairs of superpixels. A user selects an initial superpixel of interest and an algorithm analyzes the color and depth distance to the neighboring superpixels. Thresholds setting the maximum allowed distances determine the affiliation or the rejection of the analyzed neighboring superpixels to the resulting cluster of superpixels. The cluster forming algorithm is intended to generate connected superpixels encompassing only superpixels belonging to the same scene object selected by the user.

Figure 1:
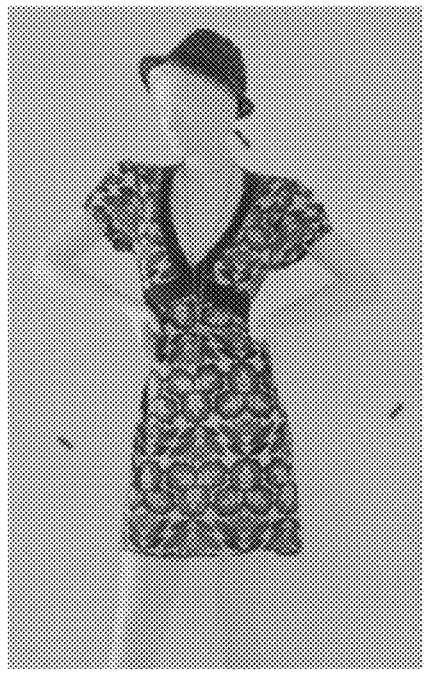
FIG. 1 shows an input image.
Figure 2:
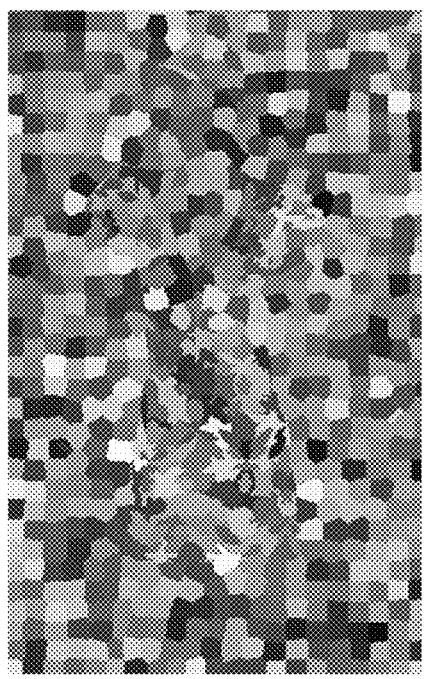
FIG. 2 shows superpixels associated to the input image of FIG. 1.
Figure 3:
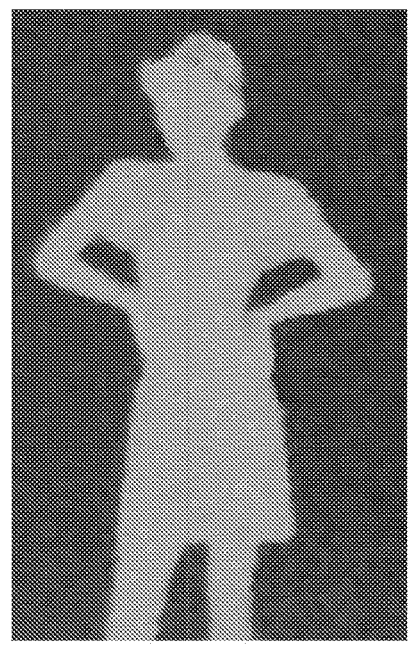
FIG. 3 shows depth information associated to the input image of FIG. 1.

FIGS. 1 to 3 show the input data used for the generation of connected superpixels. FIG. 1 depicts the color information, FIG. 2 the superpixel areas, and FIG. 3 the depth information, where brighter pixels are closer to the camera than darker pixels. The example of FIG. 1 demonstrates the similarity between objects of the foreground and the background in the scene as the skin color of the mannequin is very similar to the color of the white wall in the scene. Assuming that the generation of a connected superpixel is started by selecting the mannequin's face, the resulting superpixel cluster—if based on the color information analysis alone—will probably include superpixels of the light grey background in the scene. This is prevented by incorporating the depth information during the cluster forming.

Figure 4:
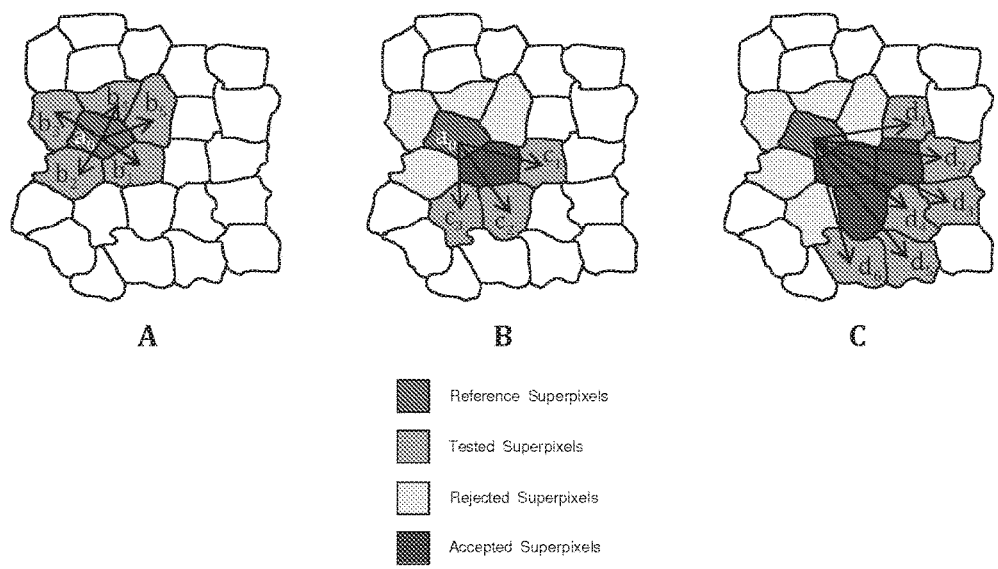
FIG. 4 illustrates superpixel cluster generation using a fixed reference superpixel.
Figure 5:
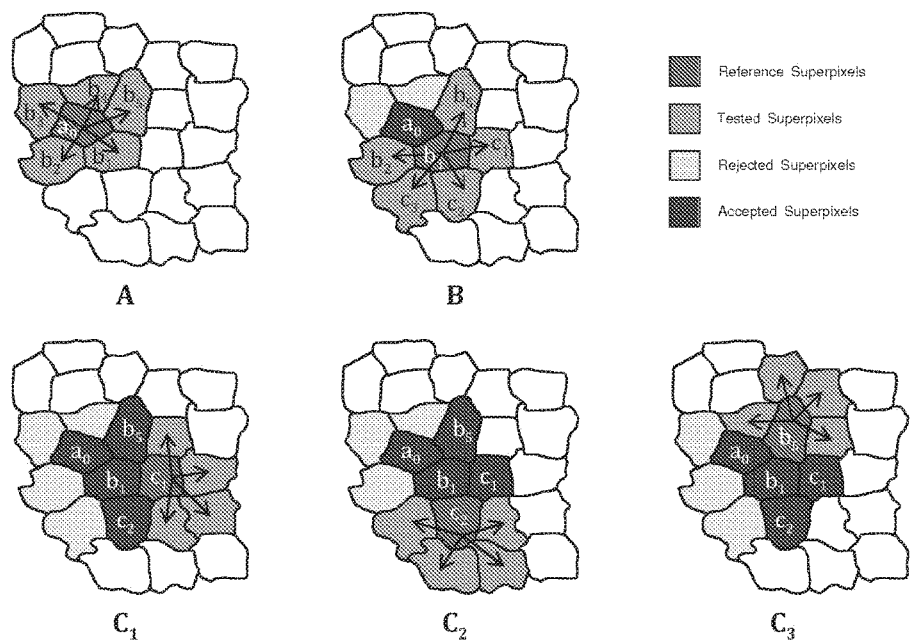
FIG. 5 illustrates superpixel cluster generation using a propagating reference superpixel.
Figure 6:
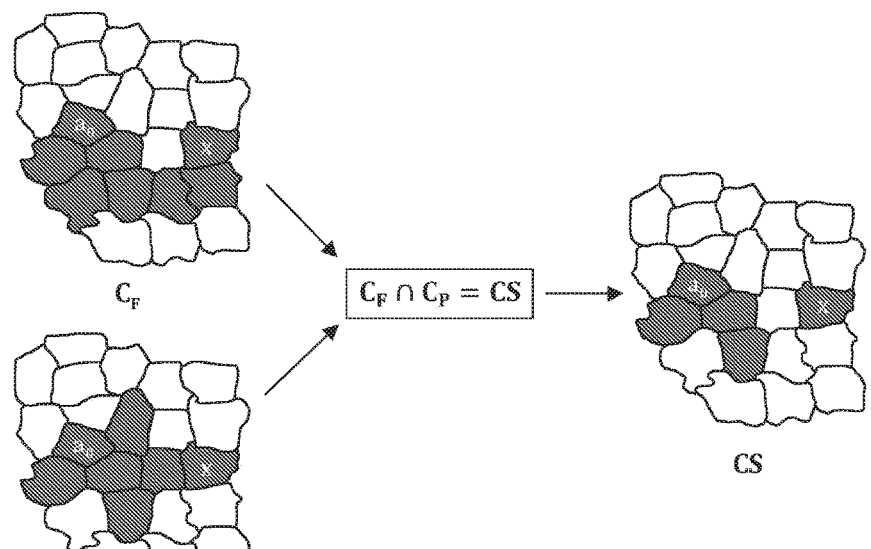
FIG. 6 shows a result of merging two superpixel clusters generated with a fixed reference superpixel and a propagating reference superpixel, respectively.

In order to present and appreciate advantages of the present principles in view of the existing known solutions, the details of the existing known solutions are first presented herewith in connection with FIG. 4 to FIG. 6. For the superpixel cluster generation the algorithm analyses two characteristics with different properties. In this example the characteristics are color information and depth information, but the general idea is not limited to these characteristics. The properties of the two characteristics differ in the way of distance measuring concerning their references. While the color information is measured using a fixed reference superpixel for the cluster, the depth information distance is measured with a propagating reference superpixel for the cluster. FIG. 4 and FIG. 5 show the differences between the cluster forming executed for the fixed reference superpixel and the propagating reference superpixel, respectively.

In particular, FIG. 4 depicts an example of the first three stages for the homogeneous cluster forming applied for color information. The user initially selects a superpixel of interest, which becomes the fixed reference superpixel for all color distance measures. It is marked by the superpixel $a_0$ in all stages of FIG. 4. During the entire cluster forming process the color distances are calculated by comparing the new candidate superpixel against the reference superpixel $a_0$. In stage A the reference superpixel $a_0$ is tested against the neighboring superpixels $b_1$ to $b_5$. In the example only superpixel $b_1$ passes the affiliation condition. In stage B the cluster forming algorithm examines the new neighboring superpixels $c_1$ to $c_3$ by comparing it against the fixed reference superpixel $a_0$ again. Here only superpixel $c_3$ is rejected and hence not included in the cluster. In stage C the new neighboring superpixels $d_1$ to $d_6$ are tested against the reference superpixel $a_0$.

FIG. 5 shows the example of the homogeneous cluster forming applied for depth information. Here the reference superpixel propagates. Stage A in FIG. 5 depicts the beginning of the process, which is the same as in FIG. 4. The reference superpixel $a_0$ is compared against the neighboring superpixels $b_1$ to $b_5$, where only $b_1$ is affiliated to the cluster. In stage B the reference superpixel propagates and superpixel $b_1$ becomes the reference. The new neighboring superpixels related to $b_1$ are analyzed by testing $c_1$, $c_2$, and $c_3$ but also $b_2$ and $b_5$ for a second time. The result of this analysis in stage B affiliates the superpixels $c_1$, $c_2$, and $b_5$ to the cluster of the connected superpixels, while superpixels $b_2$ and $c_3$ are rejected. Stage C is split into three stages, each handling a different propagating reference superpixel, and is determined by all accepted superpixels of the previous stage B. Stage $C_1$ uses superpixel $c_1$, stage $C_2$ uses superpixel $c_2$, and stage $C_3$ uses superpixel $b_5$ as propagating reference superpixels. The affiliation results of each sub-stage are merged for the cluster forming result of stage C by applying the "∩"-operator to all sets resulting from $C_1$, $C_2$, and $C_3$.

After generating two independent homogeneous clusters for color and for depth information the final superpixel clusters are generated by merging the two interim superpixel clusters. This is done be intersecting the two sets of superpixels applying the "∩"-operation. An example is shown in FIG. 6, where the homogeneous interim mask $C_F$ based on color and generated with a fixed reference superpixel is merged with the homogeneous interim mask $C_P$ based on depth and generated with a propagating reference superpixel by set intersection. The resulting final cluster forming the superpixel cluster CS shows a possible drawback caused by this intersection operation. The superpixel marked with x becomes locally isolated, which means that the resulting superpixel cluster is not compact.

Figure 7:
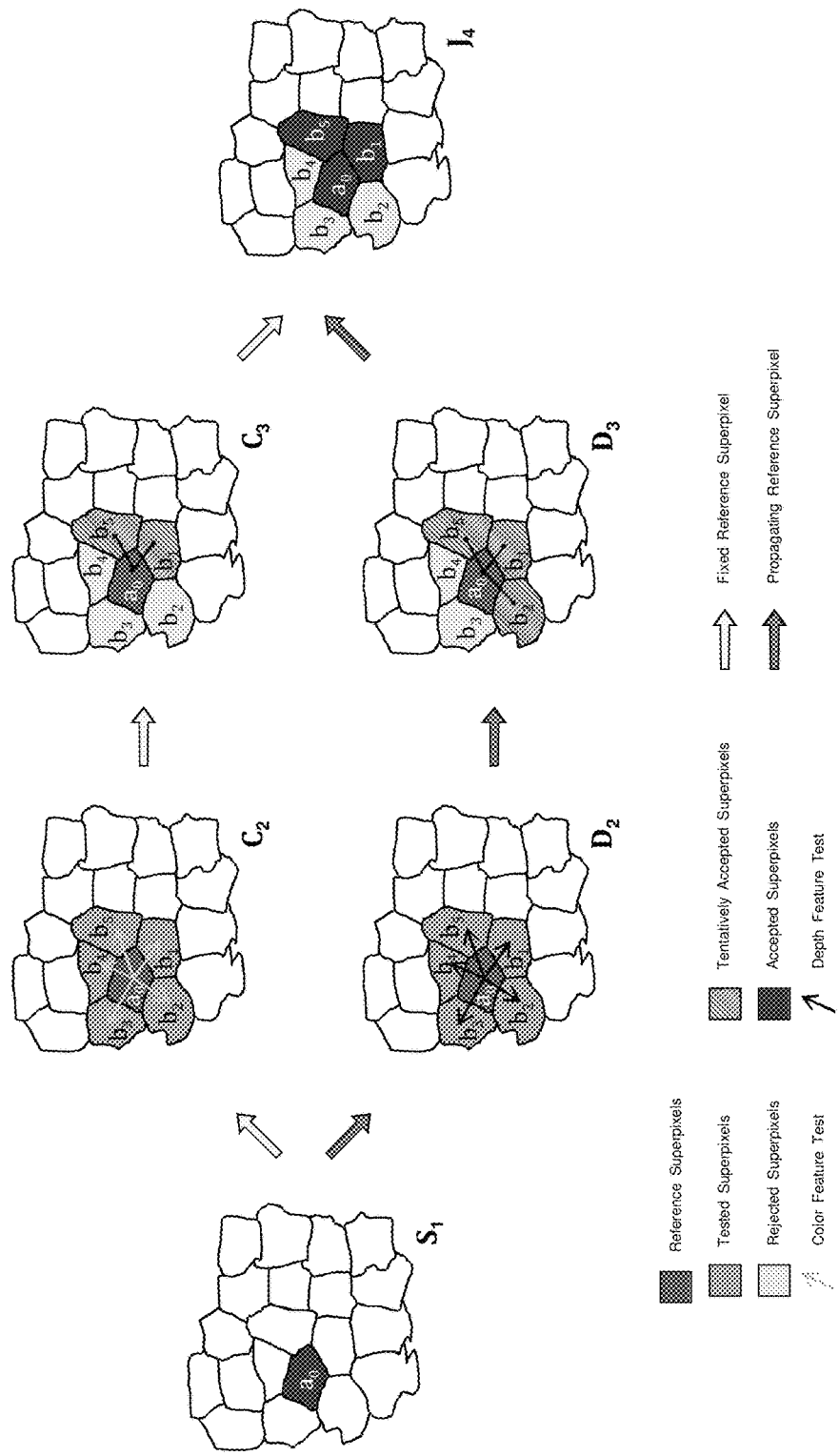
FIG. 7 illustrates a first part of a heterogeneous cluster forming process.
Figure 8:
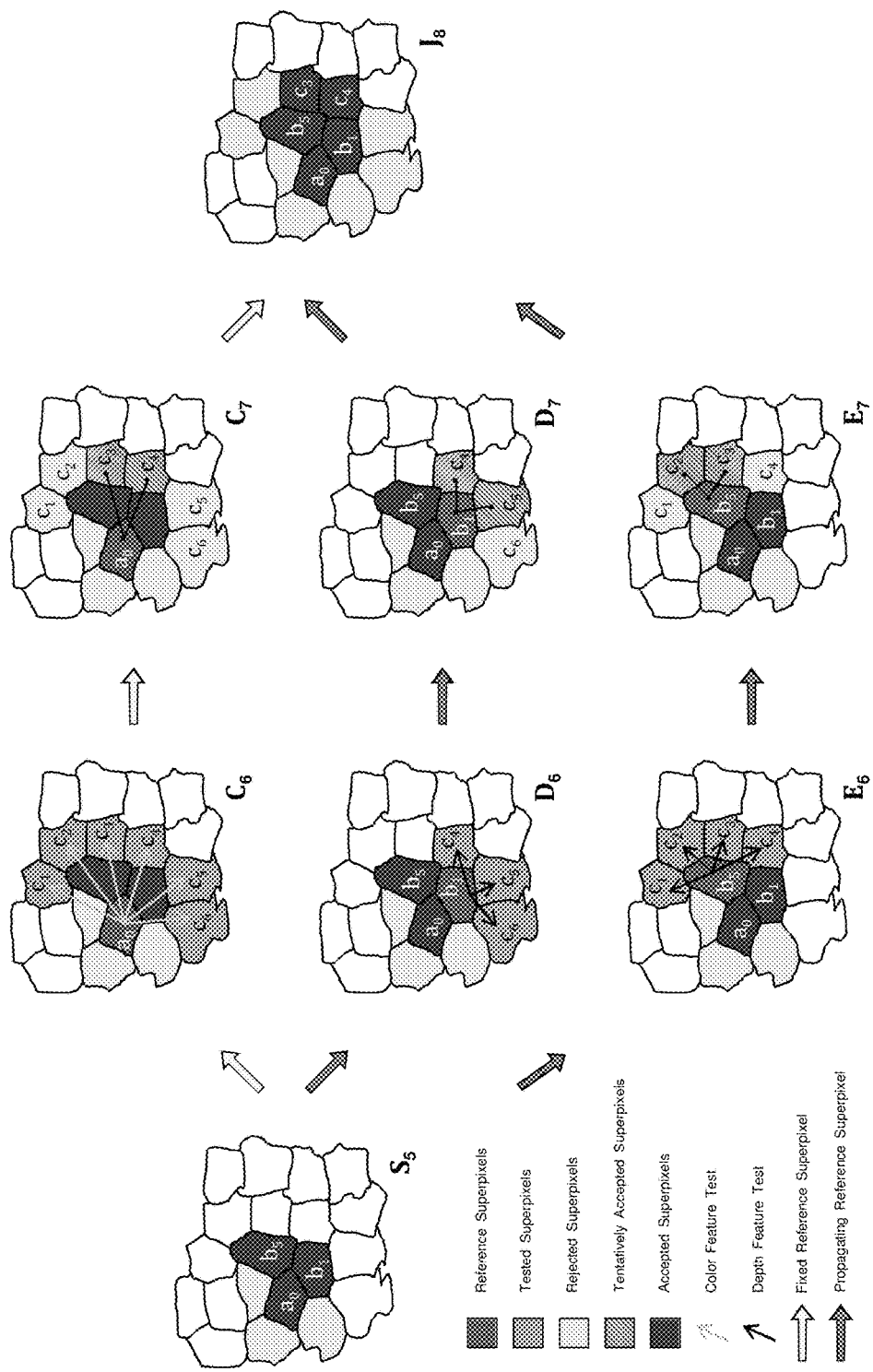
FIG. 8 illustrates a second part of a heterogeneous cluster forming process, FIG. 9 schematically shows a method according to the invention for generating superpixel clusters.

The principle of the proposed heterogeneous cluster forming process is depicted in FIGS. 7 and 8. For simplicity only the relevant steps are illustrated, not the entire procedure. The heterogeneous cluster forming starts with stage $S_1$ in FIG. 7. A user selects a superpixel of interest $a_0$, to which the cluster forming is applied. The procedure goes on with two separate branches marked with C and D, treating the fixed and the propagating reference superpixels separately.

In the stages $C_2$ and $C_3$ of the first branch the color distance is evaluated using the fixed reference superpixel $a_0$. In particular the superpixels $b_1$ to $b_5$ are tested. Stage $C_3$ shows that only $b_1$ and $b_5$ reach the tentative cluster affiliation, while the remaining superpixels $b_2$, $b_3$, and $b_4$ are rejected by testing the color distance against a threshold. In the stages $D_2$ and $D_3$ of the second branch the depth distance is evaluated using the propagating reference superpixel, which in this case also is $a_0$. The depth distance evaluation in the example rejects the two superpixels $b_3$ and $b_4$, proposing $b_1$, $b_2$, and $b_5$ for cluster affiliation. Stage $J_4$ joins the clusters of $C_3$ and $D_3$ by intersecting the two sets of superpixels. Superpixels which are in both branches marked as tentatively accepted become finally accepted. The cluster resulting from stage $J_4$ constitutes an interim result, which is the new starting point for stage $S_5$ depicted in FIG. 8.

In FIG. 8 the procedure continues again with separate branches. In these branches the fixed and the propagating reference superpixels are treated separately. In the upper branch C the fixed reference superpixel $a_0$ is used to test the color distance measures for stages $C_6$ and $C_7$. The threshold evaluation of color distance measures for the superpixels $c_1$ to $c_6$ depicted in stage $C_6$ rejects all superpixels except $c_3$ and $c_4$, as shown in stage $C_7$.

The remaining branches D and E are dedicated to the evaluation of the propagating reference superpixels. In the present case there are two branches, one for each superpixel affiliated in the previous step, i.e. $b_1$ and $b_5$. Superpixel $b_1$ becomes the propagating reference superpixel for branch D, whereas superpixel $b_5$ becomes the propagating reference superpixel for branch E. Of course, if more superpixels are affiliated in the previous step, more branches are used. In stage $D_6$ the new neighboring superpixels $c_4$ to $c_6$ related to $b_1$ are tested by checking the depth distance measures. Stage $D_7$ shows that superpixels $c_4$ and $c_5$ are tentatively accepted. In stage $E_6$ the new neighboring superpixels related to $b_5$ are verified by assessing the depth distance measures against superpixels $c_1$ to $c_4$, of which $c_2$ and $c_3$ are tentatively affiliated as shown in stage $E_7$.

The clustering results of stages $C_7$, $D_7$, and $E_7$ are joined in stage $J_8$. This is done by a pairwise application of the set intersection operation for the fixed reference superpixel result $C_7$ and all propagating reference superpixel results $D_7$ and $E_7$, followed by an accumulation according to the equation $$J_8 = (C_7 \cap D_7) \cup (C_7 \cap E_7).$$

The general rule for joining tentatively accepted superpixels with the final cluster is to accumulate ("∪"-operation) the pairwise intersections ("∩"-operation). The pairwise intersections are built from the single set F obtained with the fixed reference superpixel matched to all individual sets $P_n$ formed using the different propagating reference superpixels. This can be expressed by the equation $$J_k = \bigcup_{i=1}^{N_{k-1}} (F_{k-1} \cap P_{k-1,i}).$$

The set F contains the superpixels resulting from the 'fixed reference superpixel cluster forming' process, whereas the sets $P_i$ are the superpixel sets generated by the different 'propagating reference superpixel cluster forming' processes. The count $N_{k-1}$ of sets generated by the different propagating reference superpixel cluster forming branches is determined by the number of affiliated superpixels of the previous joining $J_{k-1}$, starting with the superpixel of interest $a_0$ selected by the user.

The example stops here, but the heterogeneous cluster forming process preferably continues until reaching the condition that either all superpixels in the picture have been evaluated or that all superpixel candidates are rejected for the cluster.

The proposed solution provides the advantage of a simultaneous assessment of fixed and propagating clusters. This includes the simultaneous evaluation of color and depth distance measurements. A further advantage is the enforcement of connectivity by excluding the affiliation of locally isolated areas belonging to the final connected superpixels. Results as depicted for the connected superpixel in FIG. 6 are avoided.

A useful extension of the heterogeneous cluster forming consists of the application of the procedure to several related images, i.e. successive images of a sequence of images. This is possible also for cases where no temporally consistent superpixels are generated for a video. By doing this the dimensionality of the cluster forming is incremented from 2 to 3, resulting in volume clusters instead of the previously plane areas. The heterogeneous cluster forming can also be applied in three dimensions, where adjacent neighboring superpixels can be located within the same image, but also within the temporally directly previous or following image. While the directly neighboring superpixels located in the same image have contact at their border pixels, the neighboring superpixels located in separate images have contact by overlapping pixel areas. The heterogeneous cluster forming process is the same, but has to consider and include the superpixels neighboring in the direction of time.

A potential application for this three dimensional cluster forming is to select a scene object in time. If, for example, in the scene of FIG. 1 the head of the mannequin is selected by a user, the three dimensional heterogeneous cluster forming will track the head within the whole scene. This allows easily modifying the head in the scene, for example by changing its color. Especially the three dimensional generation of connected superpixels requires the compliance of the connectivity objective, which is guaranteed by the proposed heterogeneous cluster forming. Otherwise the connected superpixels describe a disruptive formation of particles, which do not allow object modifications in a scene.

Figure 9:
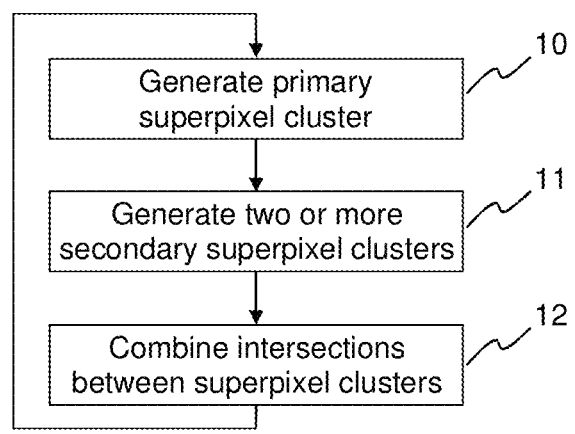

A method according to the invention for generating a superpixel cluster for an image or a sequence of images is schematically shown in FIG. 9. In a first processing branch a primary superpixel cluster is generated 10 using a fixed reference superpixel. In a second processing branch two or more secondary superpixel clusters are generated 11 using a propagating reference superpixel. A final superpixel cluster is then generated by combining 12 intersections between the primary superpixel cluster and the two or more secondary superpixel clusters. The primary superpixel cluster and the two or more secondary superpixel clusters are either generated 10, 11 in parallel or sequentially. Preferably the schematic is applied iteratively and continues until reaching the condition that either all superpixels in the picture have been evaluated or that all superpixel candidates are rejected for the cluster.

Figure 10:
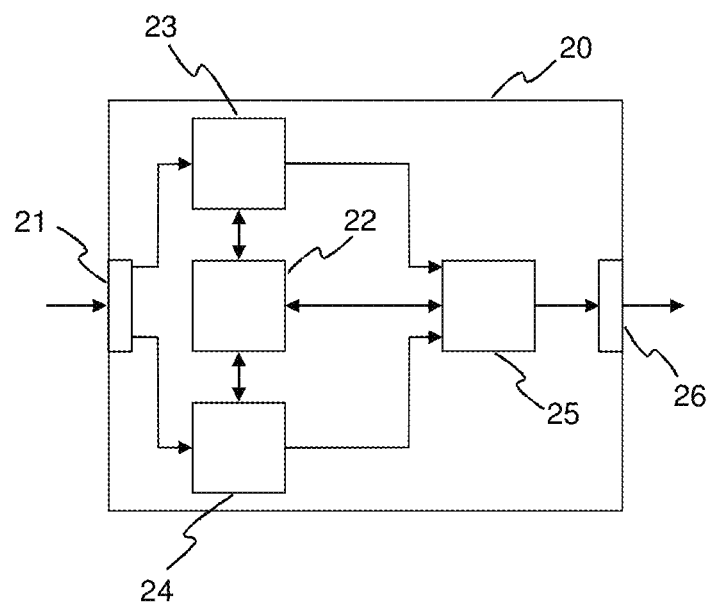
FIG. 10 illustrates an apparatus adapted to implement a solution according to the invention for generating superpixel clusters.

FIG. 10 schematically illustrates an apparatus 20 adapted to implement a solution according to the invention for generating a superpixel cluster for an image or a sequence of images. The apparatus 20 has an input 21 for receiving the image and the superpixels for the image, e.g. from a network or a storage system. Of course, the superpixels for the image may likewise be generated by dedicated circuitry (not shown) within the apparatus 20. A primary clustering unit 23 generates 10 a primary superpixel cluster using a fixed reference superpixel, whereas a secondary clustering unit 24 generates 11 two or more secondary superpixel clusters using a propagating reference superpixel. A combining unit 25 then combines 12 intersections between the primary superpixel cluster and the two or more secondary superpixel clusters to generate a final superpixel cluster. Favorably, the schematic is applied iteratively and continues until reaching the condition that either all superpixels in the picture have been evaluated or that all superpixel candidates are rejected for the cluster. For this purpose the generated clusters are, for example, stored in a local storage 22 of the apparatus 20. The resulting superpixel cluster is preferably made available for further processing via an output 26. Of course, the different units 23, 24, 25 may likewise be fully or partially combined into a single unit. They may also be implemented as software running on a processor. In addition, the input 21 and the output 26 may be combined or partially combined into a single bi-directional interface.

The invention claimed is:

1. A method for generating by at least one processor a superpixel cluster for an image or a sequence of images through successive propagation stages leading to add neighboring superpixels into said superpixel cluster, the method comprising at each of said propagation stages:
generating a primary interim superpixel cluster using a fixed reference superpixel;
generating two or more secondary interim superpixel clusters using a propagating reference superpixel;
combining intersections between the primary interim superpixel cluster and the two or more secondary interim superpixel clusters to generate a combined interim superpixel cluster;
said method further comprising outputting the generated superpixel cluster for processing said image or sequence of images; and
wherein said superpixel cluster for the image or the sequence of images is generated through said successive propagation stages, each of said successive propagation stages generating said combined interim superpixel, said combined interim superpixel being used by a subsequent propagation stage for the generating the primary interim superpixel cluster using a fixed reference superpixel and for the generating the two or more secondary interim superpixel clusters using a propagating reference superpixel.

2. The method according to claim 1, wherein the primary interim superpixel cluster and the two or more secondary interim superpixel clusters are generated by analyzing distances between properties of a superpixel and the respective reference superpixel.

3. The method according to claim 1, wherein the primary interim superpixel cluster is generated based on a first property of the superpixels and the two or more secondary interim superpixel clusters are generated based on a second property of the superpixels.

4. The method according to claim 3, wherein the first property is color information and the second property is depth information.

5. The method according to claim 1, wherein a superpixel is marked as tentatively accepted if a distance between a selected property of the superpixel and said selected property of the respective reference superpixel does not exceed a respective threshold.

6. The method according to claim 1, wherein the primary interim superpixel cluster and the two or more secondary interim superpixel clusters are generated from superpixels associated to the same image.

7. The method according to claim 1, wherein the primary interim superpixel cluster and the two or more secondary interim superpixel clusters are generated from superpixels associated to the same image and superpixels associated to different images of the sequence of images.

8. An apparatus configured to generate a superpixel cluster for an image or a sequence of images through successive propagation stages leading to add neighboring superpixels into said superpixel cluster, the apparatus comprising at least one processor configured for, at each of said propagation stages:
   generating at each of said propagation stages a primary interim superpixel cluster using a fixed reference superpixel;
   generating at each of said propagation stages two or more secondary interim superpixel clusters using a propagating reference superpixel; and
   combining at each of said propagation stages intersections between the primary interim superpixel cluster and the two or more secondary interim superpixel clusters to generate a combined interim superpixel cluster
and said apparatus further comprising at least one output adapted to output the generated superpixel cluster for processing said image or sequence of images; and
   wherein said superpixel cluster for the image or the sequence of images is generated through said successive propagation stages, each of said successive propagation stages generating said combined interim superpixel, said combined interim superpixel being used by a subsequent propagation stage for the generating the primary interim superpixel cluster using a fixed reference superpixel and for the generating the two or more secondary interim superpixel clusters using a propagating reference superpixel.

9. A computer readable non-transitory storage medium having stored therein instructions enabling generating a superpixel cluster for an image or a sequence of images through successive propagation stages leading to add neighboring superpixels into said superpixel cluster, which when executed by a computer, cause the computer at each of said propagation stages to:
   generate a primary interim superpixel cluster using a fixed reference superpixel;
   generate two or more secondary interim superpixel clusters using a propagating reference superpixel; and
   combine intersections between the primary interim superpixel cluster and the two or more secondary interim superpixel clusters to generate a combined interim superpixel cluster
and to output the generated superpixel cluster for processing said image or sequence of images; and
   wherein said superpixel cluster for the image or the sequence of images is generated through said successive propagation stages, each of said successive propagation stages generating said combined interim superpixel, said combined interim superpixel being used by a subsequent propagation stage for the generating the primary interim superpixel cluster using a fixed reference superpixel and for the generating the two or more secondary interim superpixel clusters using a propagating reference superpixel.

10. The apparatus according to claim 8, wherein said at least one processor is configured for generating the primary interim superpixel cluster by analyzing distances between properties of a superpixel and the respective reference superpixel and for generating the two or more secondary interim superpixel clusters by analyzing distances between properties of a superpixel and the respective reference superpixel.

11. The apparatus according to claim 8, wherein said at least one processor is configured for generating the primary interim superpixel cluster based on a first property of the superpixels and for generating the two or more secondary interim superpixel clusters based on a second property of the superpixels.

12. The apparatus according to claim 11, wherein the first property is color information and the second property is depth information.

13. The apparatus according to claim 8, wherein the apparatus is configured to mark a superpixel as tentatively accepted if a distance between a selected property of the superpixel and said selected property of the respective reference superpixel does not exceed a respective threshold.

14. The apparatus according to claim 8, wherein said at least one processor is configured for generating the primary interim superpixel cluster and the two or more secondary interim superpixel clusters, respectively, from superpixels associated to the same image.

15. The apparatus according to claim 8, wherein said at least one processor is configured for generating the primary interim superpixel cluster and the two or more secondary interim superpixel clusters, respectively, from superpixels associated to the same image and superpixels associated to different images of the sequence of images.

16. The computer readable non-transitory storage medium according to claim 9, wherein the instructions cause the computer to generate the primary interim superpixel cluster and the two or more secondary interim superpixel clusters by analyzing distances between properties of a superpixel and the respective reference superpixel.

17. The computer readable non-transitory storage medium according to claim 9, wherein the instructions cause the computer to generate the primary interim superpixel cluster based on a first property of the superpixels and to generate the two or more secondary interim superpixel clusters based on a second property of the superpixels.

18. The computer readable non-transitory storage medium according to claim 17, wherein the first property is color information and the second property is depth information.

19. The computer readable non-transitory storage medium according to claim 9, wherein the instructions cause the computer to mark a superpixel as tentatively accepted if a distance between a selected property of the superpixel and said selected property of the respective reference superpixel does not exceed a respective threshold.

20. The computer readable non-transitory storage medium according to claim 9, wherein the instructions cause the computer to generate the primary interim superpixel cluster and the two or more secondary interim superpixel clusters from superpixels associated to the same image.

21. The computer readable non-transitory storage medium according to claim 9, wherein the instructions cause the computer to generate the primary interim superpixel cluster and the two or more secondary interim superpixel clusters from superpixels associated to the same image and superpixels associated to different images of the sequence of images.

* * * * *